United States Patent [19]
Phillips

[11] Patent Number: 4,648,568
[45] Date of Patent: Mar. 10, 1987

[54] EMERGENCY ANTI-TORQUE CONTROL SYSTEM AND METHOD FOR HELICOPTERS

[76] Inventor: Richard G. Phillips, 3598-5 Club House Cir. E., Decatur, Ga. 30032

[21] Appl. No.: 738,409

[22] Filed: May 28, 1985

[51] Int. Cl.$^4$ ............................................. B64C 27/82
[52] U.S. Cl. .............................. 244/17.19; 244/76 R; 244/17.13
[58] Field of Search ............... 244/17.11, 17.13, 17.15, 244/17.19, 17.21, 139, 147, 149, 76 R

[56] References Cited

U.S. PATENT DOCUMENTS

| | | | |
|---|---|---|---|
| 2,419,604 | 4/1947 | Stanley | 244/17.19 |
| 2,518,697 | 10/1944 | Lee | 244/17.19 |
| 2,673,051 | 3/1954 | Frost | 244/139 |
| 3,097,819 | 7/1963 | Raistakka | 244/147 |
| 3,227,399 | 1/1966 | Dastoli et al. | 244/17.19 |
| 3,713,387 | 1/1973 | Karp | 244/147 |
| 3,930,628 | 1/1976 | Robelen | 244/139 |
| 4,004,764 | 1/1977 | Burklund et al. | 244/149 |
| 4,200,252 | 4/1980 | Logan et al. | 244/17.19 |
| 4,496,122 | 1/1985 | Whipple | 244/139 |

OTHER PUBLICATIONS

Grumm et al, "Advanced Antitorque Concepts Study", USAAMRDL Tech Rep 71-23, Jul. 1971, p. 128.

Primary Examiner—Galen Barefoot
Attorney, Agent, or Firm—Thomas & Kennedy

[57] ABSTRACT

A drogue chute is deployed to the rear of a helicopter in the event of tail rotor malfunction. Deployment may be initiated automatically with the use of a microprocessor upon an abnormal level of rotor shaft vibration being sensed.

10 Claims, 7 Drawing Figures

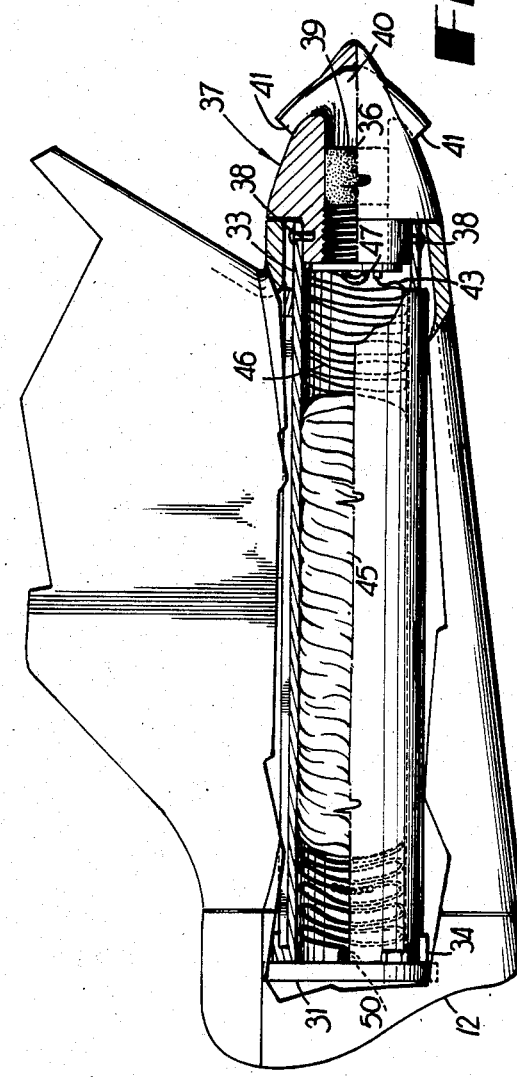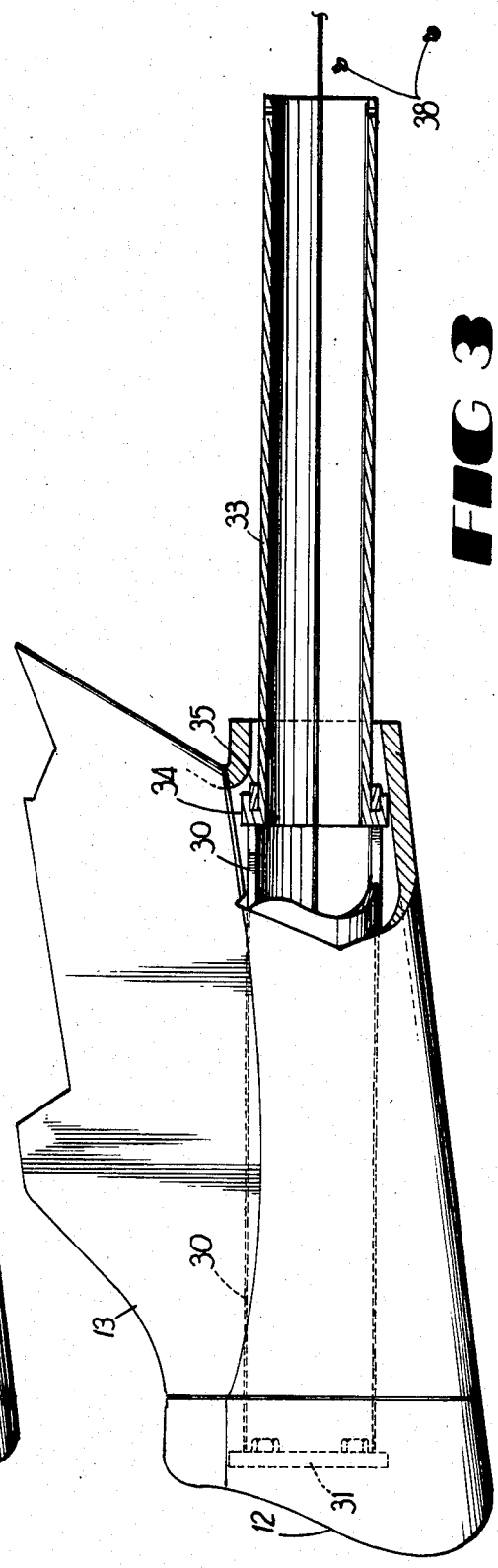

4,648,568

EMERGENCY ANTI-TORQUE CONTROL SYSTEM AND METHOD FOR HELICOPTERS

TECHNICAL FIELD

This invention relates generally to helicopters, and particularly to systems and methods for stabilizing helicopters experiencing a tail rotor malfunction.

BACKGROUND OF THE INVENTION

Where helicopters are designed with a single main rotor for providing lifting forces, they must be provided with means for counteracting the torque exerted by the main rotor upon the helicopter body. This is conventionally done with a tail rotor mounted to the helicopter tail boom or vertical fin for rotation within a vertical plane. Should the tail rotor malfunction, the torque developed by the main rotor ceases to be counteracted properly by the tail rotor. In this event the helicopter body may start to rotate about the main rotor axis which, where the malfunction is severe, can produce an uncontrollable situation that can result in the helicopter crashing. Tail rotor malfunction may arise from mechanical failure. In military operations such a malfunction can result from damage inflicted by enemy fire upon the tail rotor or upon the tail rotor drive transmission system.

Helicopters have been devised with other means for providing anti-torque forces to the helicopter body or fuselage. For example, as shown in U.S. Pat. Nos. 2,518,697 and 4,200,252, helicopters have been designed with ducts and baffles for channeling airstreams to and about the tail boom to produce anti-torque forces in counteracting main rotor torque. Though such designs obviously eliminate the need for a tail rotor itself, they have their own problems and limitations and, of course, do not provide an emergency system for counteracting the loss of anti-torque forces for those types of helicopters that do have tail rotors.

Accordingly, the present invention is directed to systems and methods for providing emergency anti-torque control for helicopters of the type that have a tail rotor in the event of tail rotor malfunction.

SUMMARY OF THE INVENTION

In one form of the invention an emergency anti-torque control system is provided for a helicopter of the type having a tail rotor for counteracting main rotor torque. The control system comprises a housing adapted to be mounted to a rear end portion of the helicopter, and a drogue chute tethered within the housing. The system also includes means for deploying the drogue chute from the housing and to the rear of the helicopter in the event of tail rotor malfunction.

In another form of the invention, an emergency anti-torque control system is provided for a helicopter which comprises means for monitoring a tail rotor performance, and means for deploying a drogue chute in response to the monitoring means detecting the tail rotor to be malfunctioning.

In yet another form of the invention, a method of stabilizing a helicopter should the helicopter experience tail rotor malfunction comprises the step of deploying a drogue chute to the rear of the helicopter.

BRIEF DESCRIPTION OF THE DRAWING

FIG. 2 is a side elevational view, in partial cross section, of mechanical portions of the emergency anti-torque control system shown in an inactive, stowed configuration;

FIG. 3 is a side elevational view, in partial cross section, of the emergency anti-torque control system illustrated in FIG. 2 shown in an activated, deployed configuration;

DETAILED DESCRIPTION

Figure 1:
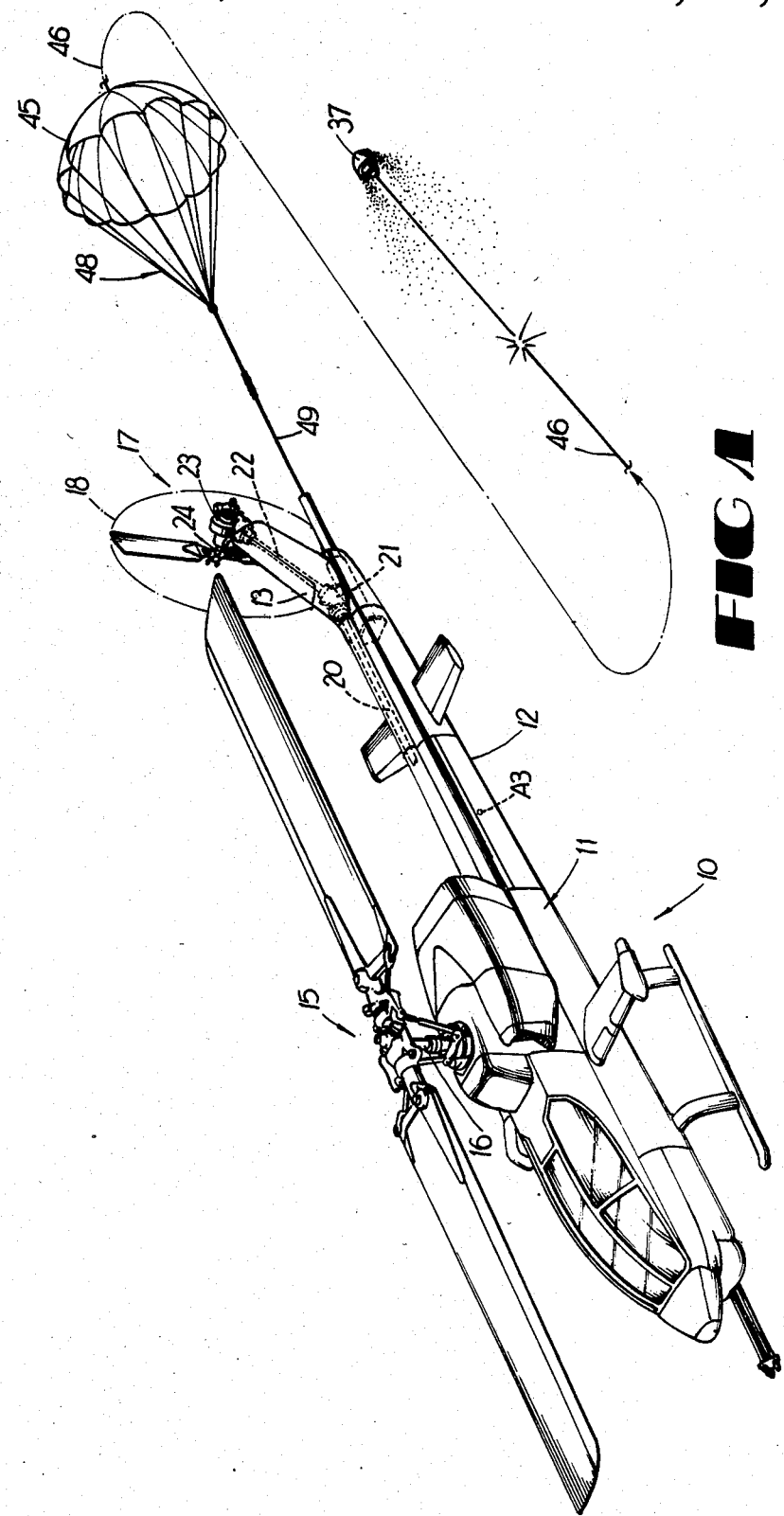
FIG. 1 is a perspective view of a helicopter equipped with an emergency anti-torque control system embodying principles of the present invention shown with the system in the process of being activated.
Figure 4:
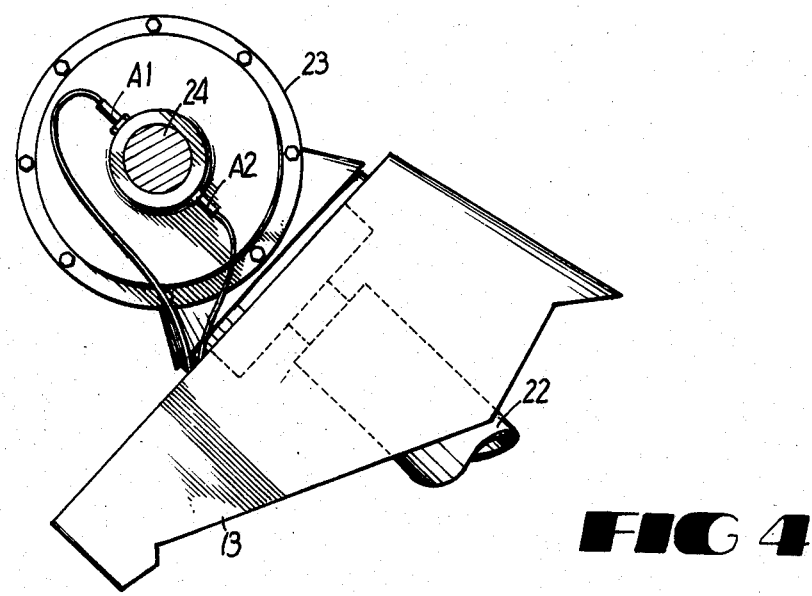
FIG. 4 is an inclined plan view of the 90° tail rotor gear box component of the tail rotor drive transmission system with the tail rotor output drive shaft shown in cross-section.

With reference next to the drawing, and particularly to FIGS. 1 and 4, there is shown a helicopter 10 having a body or fuselage 11 from which an elongated tail boom 12 rearwardly extends to an upwardly inclined tail fin 13. The helicopter has a two blade main rotor 15 mounted atop a vertical oriented main rotor drive shaft 16. The helicopter also has a tail rotor indicated generally at 17 mounted for revolution along a path of travel indicated at 18 lying in a vertical plane for counteracting the torque imparted to the helicopter body 11 by normal operation of main rotor 15. The tail rotor is driven by a power transmission system that includes a tail rotor drive shaft 20, an intermediate 42° gear box 21, an intermediate drive shaft 22, a 20° tail rotor gear box 23, and an output drive shaft 24. All of the just described components of the helicopter are conventional with the particular helicopter illustrated being of a military type known as the Cobra.

With reference not to FIGS. 2 and 3, a mechanical portion of the emergency anti-torque control system is seen to include a housing that has a stationary, outer tubular member or barrel 30 rigidly mounted at one of its ends to a system mount 31 so as to extend generally parallel to the orbital plane of the main rotor. The mount 31 itself is secured to the tail boom vertical stabilizer spar. The housing also has a movable, inner tubular member 33 that is telescopically housed within the outer tubular member 30. The end of the movable member 33, located adjacent mount 31, has a pair of radial stops 34 that extend through longitudinal slots formed within the stationary outer tubular member 30. These slots extend from the mount 31 to a location closely adjacent an end 35 of the stationary tubular member 30 located distal the mount 31.

A projectile 37 is shown mounted partially to an open end of the movable, inner tubular member 33 and releasably secured thereto by two soft metal pins 38 that extend radially through small holes formed in an end portion of the inner tubular member 33 and into the body of the projectile 37. The projectile is packed with an explosive material 36 behind a breachable membrane or wad 39 that separates the explosive material from an inner chamber 40 located within the nose of the projectile. The chamber 40 is in fluid communication with a set of vents 41 that open rearwardly from the nose of the projectile. The explosive material 36 is ignitable by means of an ignition system that includes an electrical ignition line 43 which extends from the base of the projectile 37.

Within the housing inner tubular member 33 is packed a drogue chute 45 from the canopy of which extends a flexible pull line 46 to an anchor lug 47 that is mounted to the rear end of the projectile 37. From the harness 48 of the chute extends a flexible moment cable or tether 49 to an anchoring lug 50 mounted on the system mount 31. The chute may, of course, be tethered to another element of the airframe.

In operating the anti-torque control system in an emergency, the projectile 37 is fired by ignition of the explosive material 36 whereupon the combustion gases created are exhausted through the vents 41 thereby causing the projectile to move to the rear of the helicopter. As this occurs the projectile pulls the housing tubular member 33 until its stops 34 engage the end of the longitudinal slots formed in the housing outer tubular member 30, as shown in FIG. 3. At this point, further telescopic movement of the inner tubular member 33 is arrested whereupon the projectile shears the soft metal pins 38 enabling them to fall free from the system as shown in FIG. 3. As the projectile moves from the rear of the housing, it pulls the drogue chute 45 out of the housing and expends the moment cable until it is drawn taut. Once the moment cable 49, the pull line 46, and the harness 48 are all drawn taut, further movement of the projectile 37 causes the pull line 46 which is substantially weaker than the moment cable, to snap and become severed, as illustrated in FIG. 1. The projectile is then freed from the system.

At this time the drogue chute is fully deployed to the rear of the orbit 18 of the tail rotor, as also shown in FIG. 1. In this position, it is seen that the moment cable 49 extends out through the end of the tubular member 33 beyond the tail rotor orbit 18. Gyrations of the drogue chute thus do not risk having the moment cable enter the arc of rotor travel to become severed. With deployment of the drogue chute the relative wind created by movement of the helicopter enables the chute to stabilize the helicopter and counteract the torque created by the main rotor 15. This can provide sufficient stability to the helicopter to enable the pilot to make an emergency landing if the damage to the airframe is not too severe.

The just described system may be initiated either manually, by the pilot depressing a conventional fire control button or switch, or on a fully automated basis. Automatic ignition of the system is controlled electronically by the electronic system illustrated in FIG. 5 wherein component connection pin numbers are shown within the blocks. Central to this system is a microprocessor in the preferred form here of a Motorola 6801. Basically, the microprocessor receives data from sensors that sense performance of the tail rotor, and upon receiving confirmed data indicative of a malfunctioning tail rotor initiates a projectile fire signal.

More specifically, the electronic system includes two redundant accelerometers A1 and A2 that are mounted to the 90° tail rotor gear box 23, as shown in FIG. 4. The accelerometers, which preferably are model Nos. 6608M21 Engine Vibration Monitors sold by Endeveco, Inc. of San Juan Capistrano, Calif., have their output signals imputted to pins 13 and 14, respectively, of a multiplexer which here is a Motorola type 74LS373. A third accelerometer A3, schematically shown in FIG. 1 mounted to the tail boom 12, has its signal output line coupled with pin 15 of the multiplexer. The multiplexer, which functions as a three-way switch, is controlled by signals from a peripheral interface adapter which here is a Motorola type 6821. The adapter itself is coupled with the microprocessor as illustrated in the block diagram.

Figure 6:
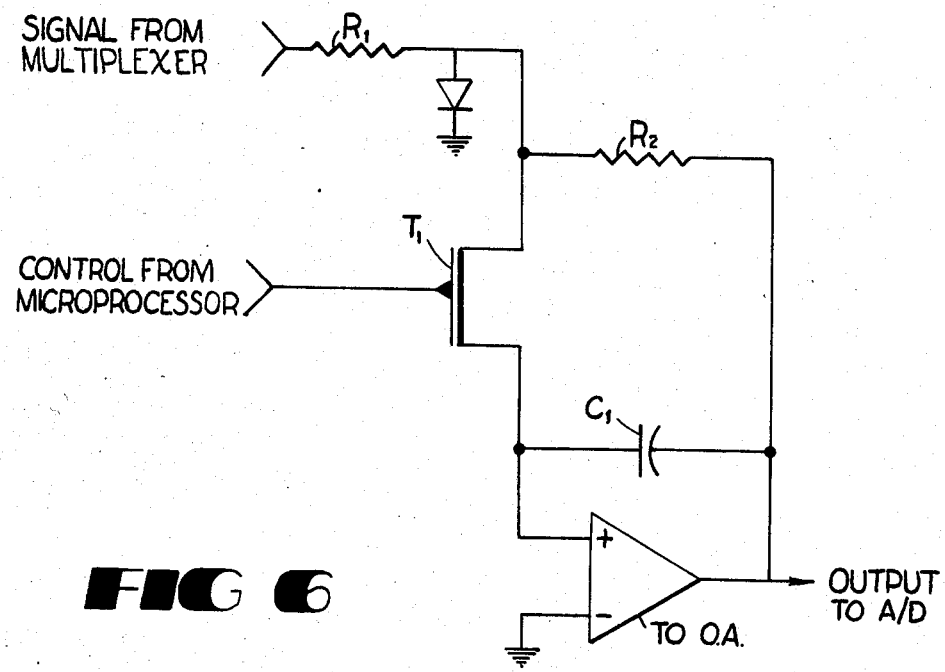
FIG. 6 is a circuit diagram of the sample and hold element shown in block digram form in FIG. 5.

The output from the multiplexer is imputted into a conventional sample and hold circuit which is shown in greater detail in FIG. 6. The sample and hold unit circuit includes a field effect type transistor $T_1$, resistor $R_1$ and $R_2$, a capacitor $C_1$ and an operational amplifier O.A. When $T_1$ is closed by the microprocessor the amplifier integrates the signals inputted from the multiplexer. Once $T_1$ is inactivated the charge on $C_1$ is held sufficiently long to enable the integrated output signal to be digitized by the A/D converter which here is preferably a Motorola type 14575-1AL. That signal is then inputted to the microprocesser.

Figure 5:
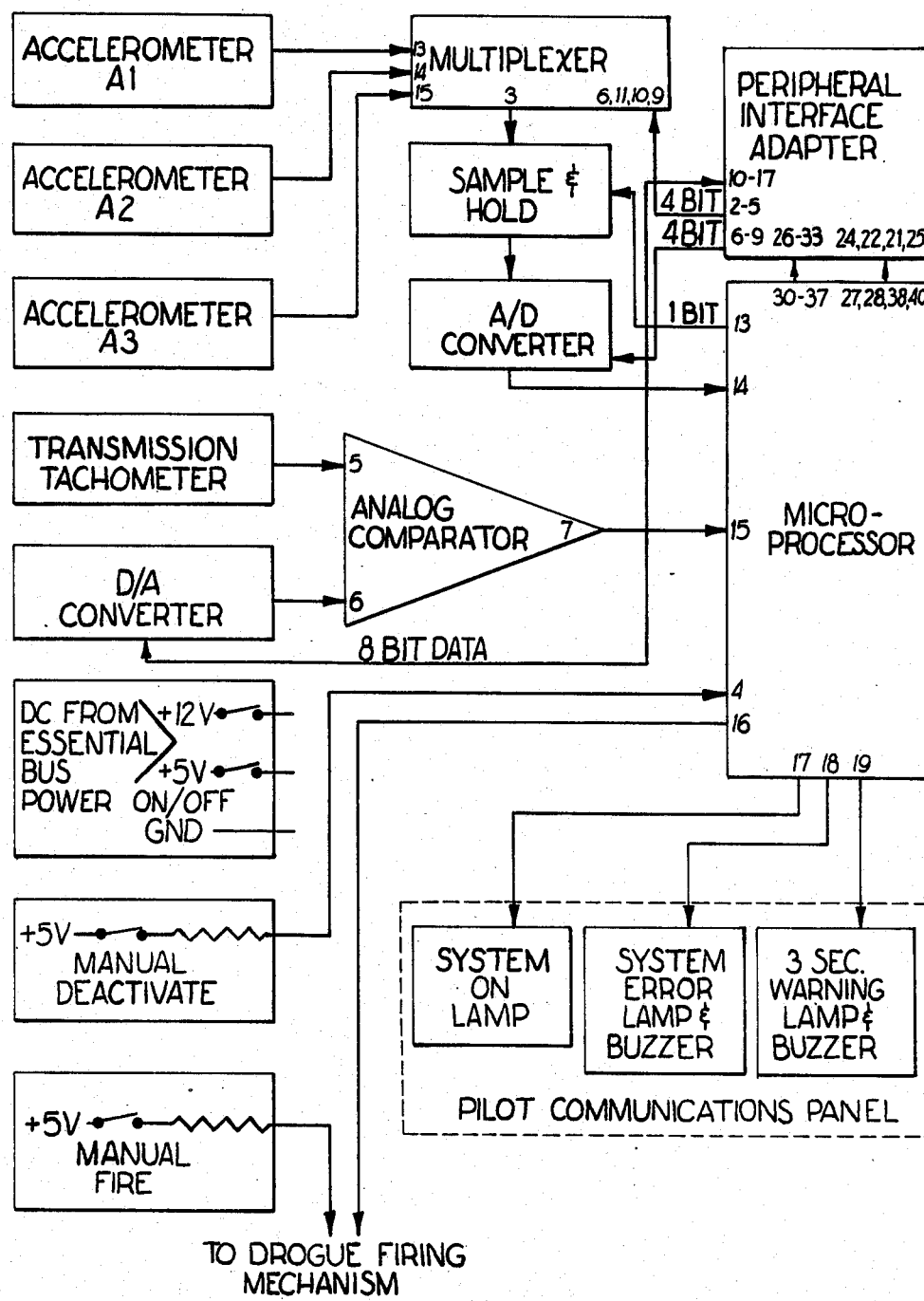
FIG. 5 is a block diagram of electronic components of the emergency anti-torque control system shown in FIGS. 1-4.

The system in FIG. 5 also includes means for inputting a signal into the microprocessor indicative of whether or not the helicopter is airbourne. This means comprises a main rotor drive transmission tachometer coupled with an analog comparator for determining if the main rotor is being driven at a speed greater than a preselected value. A manual override switch is provided for deactivating the automatic control system. A manual fire circuit is also included. Also provided are a system on lamp, a system error lamp and buzzer, and a 3 second warning lamp and buzzer that is programmed to be activated immediately prior to firing. Suitable power, and a supplemental memory are also provided but not detailed for clarity of explanation.

In automated operation accelerometers A1 and A2 generate analog signals whose level is indicative of the magnitude of tail rotor output drive shaft vibration. Signals from A1 are continuously sampled as long as they remain within a selected range indicative of normal tail rotor activity. If two successive signals from A1 are below a preselected level, indicating little or no tail rotor vibration, and thus tail rotor arrest or loss , the signal from the tachometer is checked to see if the main rotor is operating. If this is confirmed the signal from accelerometer 3 is also checked to see if the tail boom is revolving about the main rotor axis above a threshold speed. If this is also confirmed the situation apparently exists that the helicopter is airbourne and is revolving about the main rotor axis with its tail rotor not operating. The automated system thereupon issues a 3 sectond warning. If the pilot does not override it within this time frame a drogue chute fire signal is automatically initiated by the microprocessor.

Figure 7:
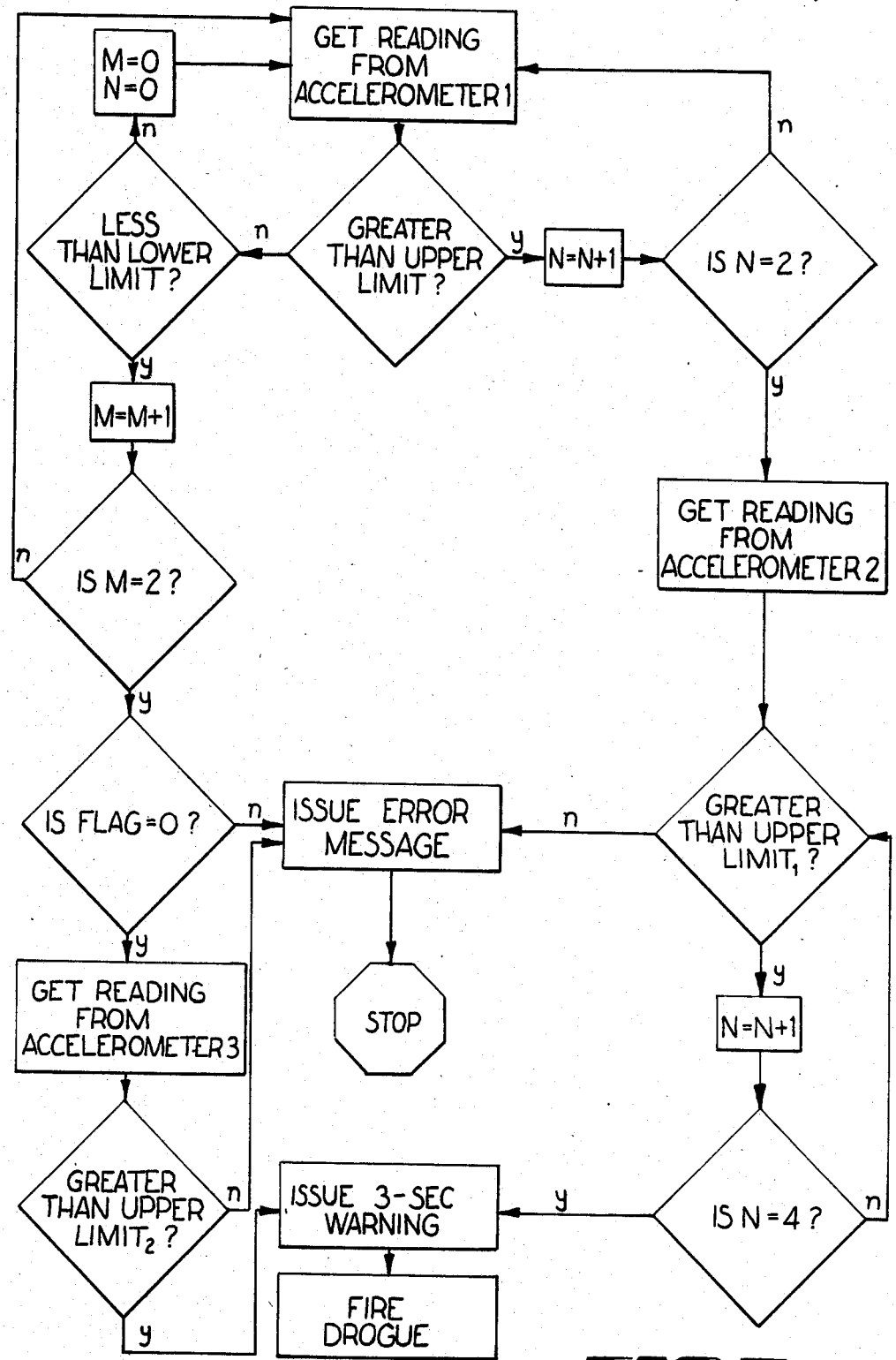
FIG. 7 is a flow diagram of the manner in which the system illustrated in block diagram form in FIG. 5 is programmed to operate.

In the event A1 generates a signal indicative of excessive tail rotor vibration, which may result from rotor or shaft damage or rotor runaway, a confirmatory Signal from A2 is sought. Failing confirmation, the automated system is deactivated and the system error lamp and buzzer activated. If A2 confirms that an excessive vibration condition exists, the 3 second warning and fire sequence is initiated. FIG. 7 reiterates the manner in which the microprocessor is programmed to effect the just described sequence in flow chart form.

It thus is seen that a system and method is provided for providing anti-torque forces to a helicopter in the event of tail rotor malfunction. It should however be understood that the just described embodiment merely illustrates principles of the invention in one preferred form. Many modifications, additions and deletions may thus be made thereto without departure from the spirit and scope of the invention as set forth in the following claims.

I claim:

1. An emergency anti-torque control system for a helicopter of the type having a tail rotor for counteracting main rotor torque, and with said control system comprising a housing adapted to be mounted to a rear end portion of the helicopter; a tethered drogue chute packed within said housing; means for deploying said drogue chute from said housing and to the rear of the helicopter in the event of tail rotor malfunction; and means for monitoring an operational performance characteristic of the tail rotor and for actuating said drogue chute deployment means in response to a detection of tail rotor malfunction.

2. The emergency anti-torque control system of claim 1 wherein said monitoring means comprises means for sensing tail rotor drive shaft vibrations.

3. The emergency anti-torque control system of claim 2 wherein said monitoring means further comprises means for sensing angular movement of the helicopter in a plane parallel to the path of travel of the main rotor.

4. An emergency anti-torque control system for a helicopter comprising a drogue chute adapted to be mounted to a rear end portion of the helicopter, means for monitoring tail rotor performance, and means for deploying said drogue chute in response to said monitoring means detecting the tail rotor to be malfunctioning.

5. The emergency anti-torque control system of claim 4 wherein said monitoring means comprises means for sensing levels of vibration of a tail rotor drive shaft.

6. The emergency anti-torque control system of claim 5 wherein said deployment means comprises a projectile tied to a drogue chute by a breakable line.

7. The emergency anti-torque control system of claim 6 further comprising microprocessor means for comparing levels of tail rotor drive shaft vibrations sensed by said monitoring means with respect to a preselected range of vibration levels and for generating a projectile fire signal in response to a sensed level being outside of said range.

8. The emergency anti-torque control system of claim 7 further comprising accelerometer means for sensing angular movement of the helicopter about the axis of a main rotor drive shaft, and wherein said microprocessor means is programmed to generate a projectile fire signal in response to a tail rotor drive shaft vibration level being detected outside of said preselected range and said accelerometer means sensing angular movement above a preselected speed.

9. A method of automatically stabilizing a helicopter in the event of an airbourne emergency comprising the steps of monitoring tail rotor operational performance and deploying a drogue chute to the rear of the helicopter in response to tail rotor operational performance being sensed to be malfunctioning.

10. An emergency anti-torque control system for a helicopter of the type having a tail rotor for counteracting main rotor torque, and with said control system comprising a housing adapted to be mounted to a rear end portion of the helicopter comprised of a movable, tubular section telescopically mounted to a stationary, tubular section; a projectile severably mounted to said movable housing section; a drogue chute packed within said housing and tethered by a moment cable; a pull line tethering said projectile to said drogue chute; and means for propelling said projectile from said housing to the rear of the helicopter, whereby upon the projectile being propelled it may telescopically extend the movable housing section beyond the tail rotor and deploy the drogue chute to the rear of the helicopter with the moment cable held clear of the tail rotor by the extended, movable housing section.

* * * * *